United States Patent [19]

Crew

[11] 3,961,846

[45] June 8, 1976

[54] ULTRA-HIGH REDUCTION MICROFICHE LAYOUT AND POSITIONING MECHANISM THEREFOR

[75] Inventor: Wynn D. Crew, Denver, Colo.

[73] Assignee: Microtech Press Inc., Lakewood, Colo.

[22] Filed: Nov. 21, 1974

[21] Appl. No.: 526,011

Related U.S. Application Data

[62] Division of Ser. No. 214,096, Dec. 30, 1971, Pat. No. 3,871,759.

[52] U.S. Cl................................................. 353/27 R
[51] Int. Cl.².................. G03B 23/08; G03B 21/11
[58] Field of Search............ 353/27, 25, 26 R, 27 R, 353/27 A, 95

[56] References Cited
UNITED STATES PATENTS

| | | | |
|---|---|---|---|
| 3,442,586 | 5/1969 | Coil | 353/27 |
| 3,743,400 | 7/1973 | Hamimg | 353/26 |

Primary Examiner—Richard E. Aegerter
Assistant Examiner—A. J. Mirabito
Attorney, Agent, or Firm—C. B. Messenger

[57] ABSTRACT

A layout page organization for ultra-high reduction microfiche is provided that presents image pages of standard book size in a 100 page format with up to 400 pages being carried on the film insert of conventional aperture cards. The image pages of the 100 page format are organized in horizontal rows and vertical columns. A selector mechanism having a base or zero position return feature uses fixed position cam index pins and follower plates that are mounted for two dimensional freedom of movement to mechanically select and locate any desired page image of a selected 100 page format or to serially move to successive page images. A zero or base position adjustment is provided to compensate for minor discrepancies in the mounting position for the film insert. In a 400 page configuration quadrant positioning of the basic 100 page format on the film insert is used, and quadrant selection is additionally incorporated in the selector mechanism.

15 Claims, 16 Drawing Figures

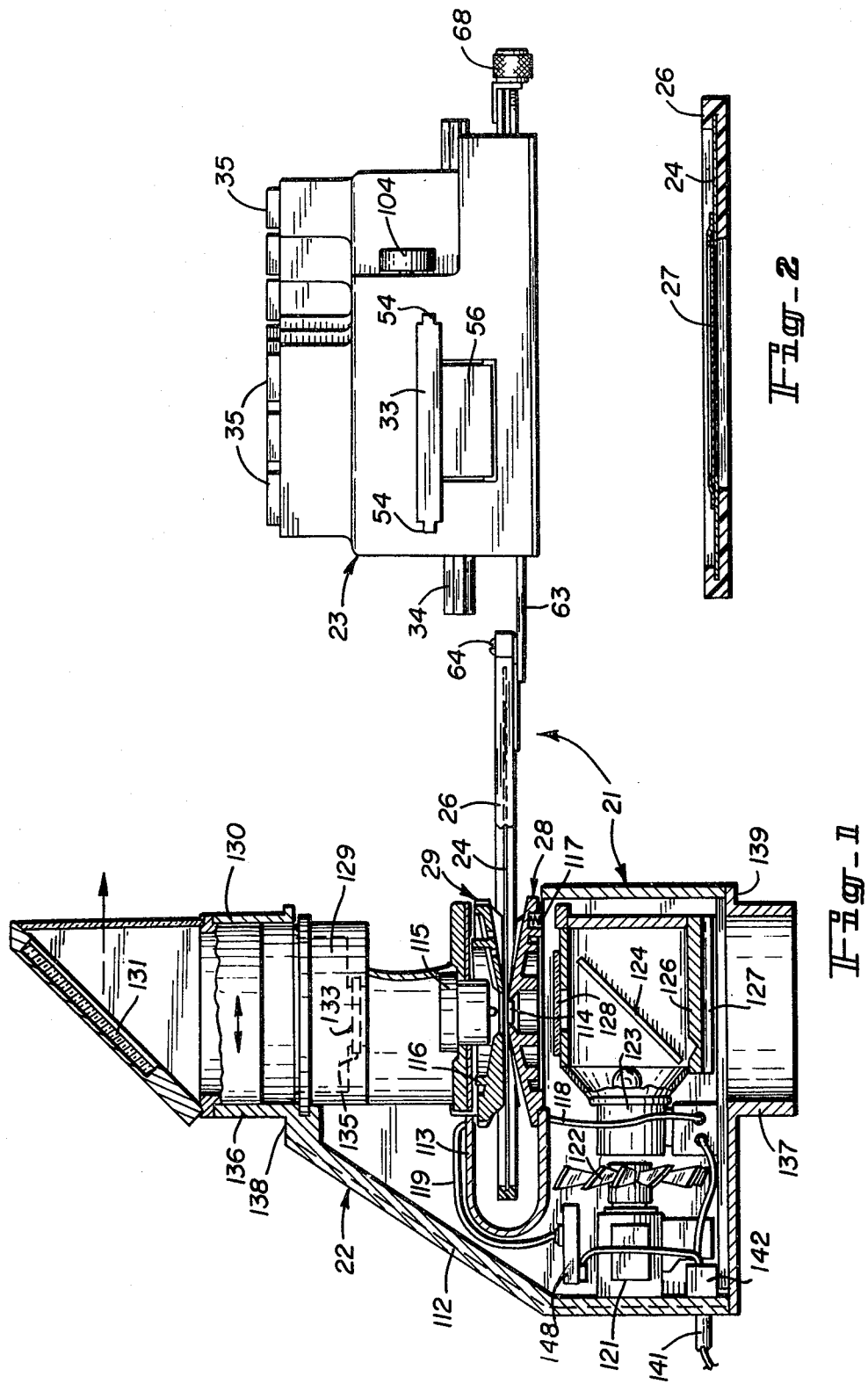

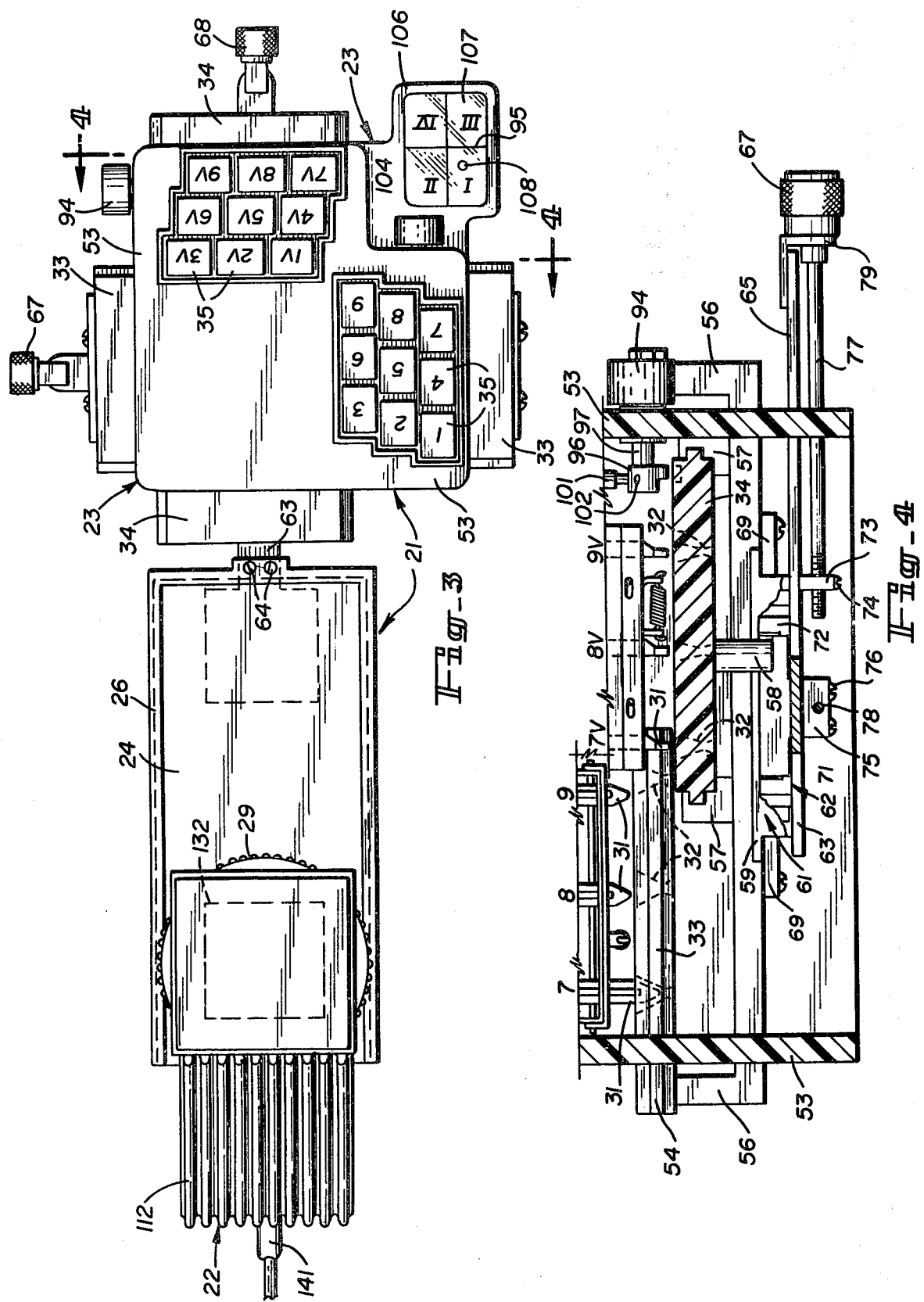

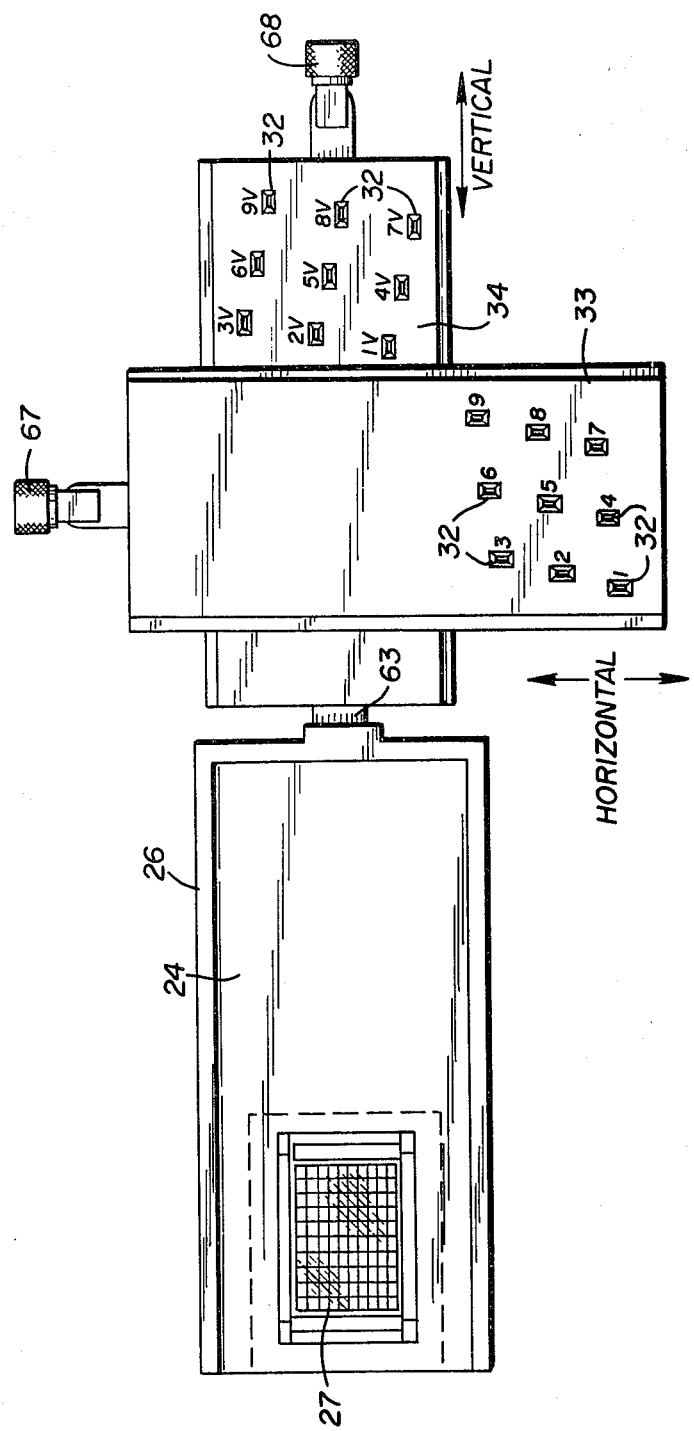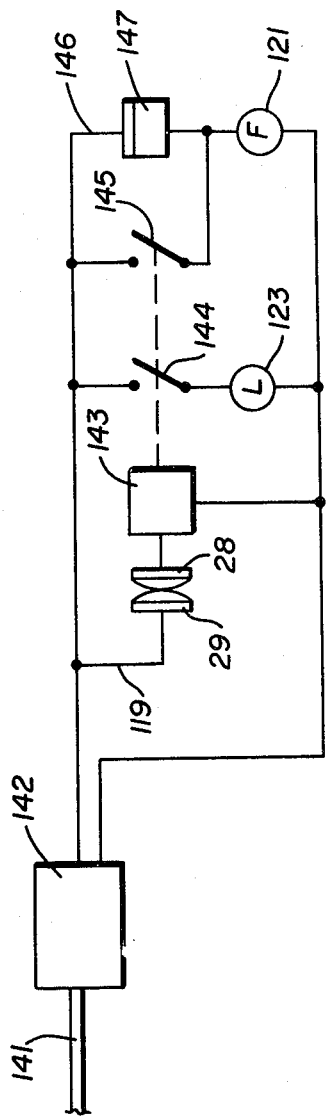

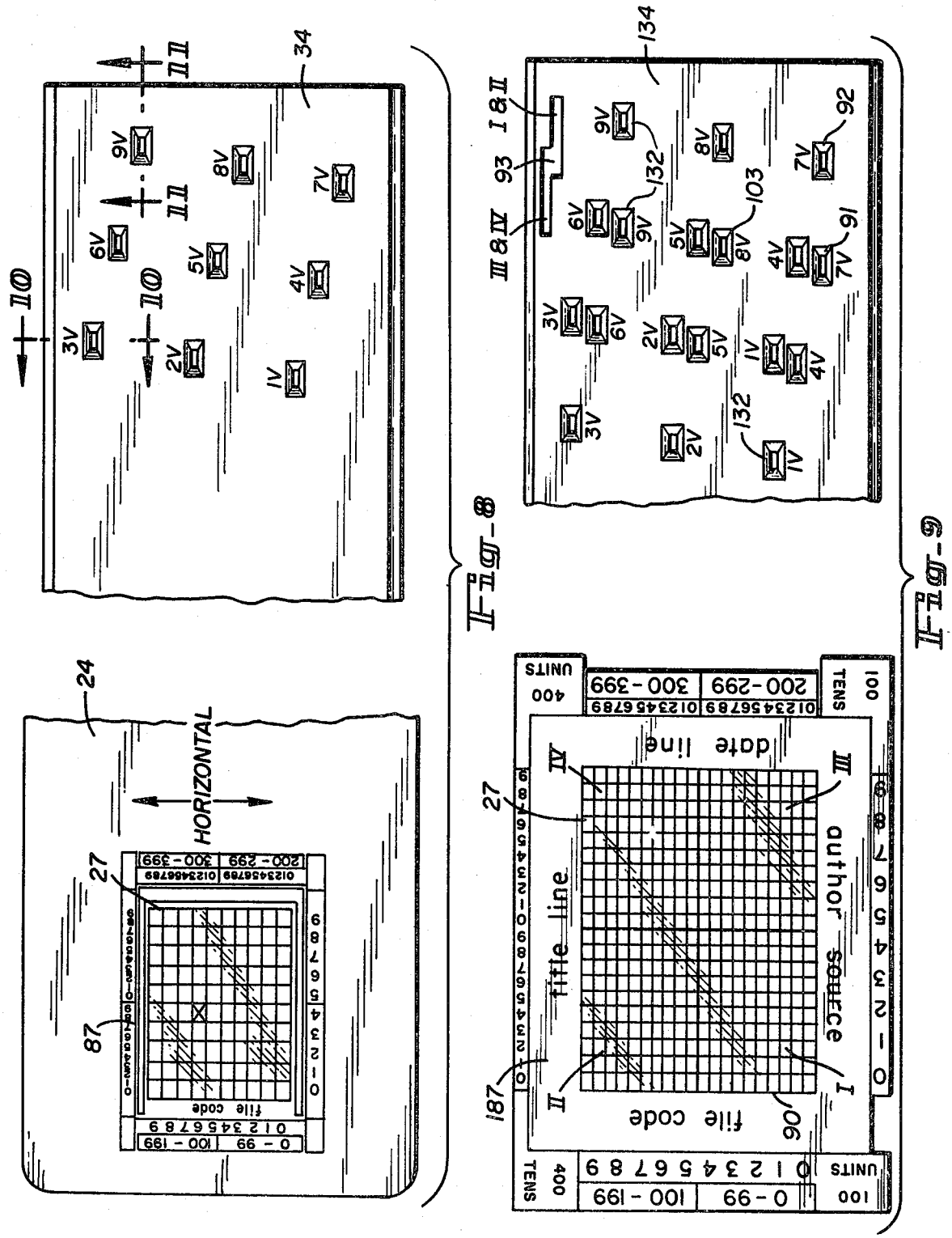

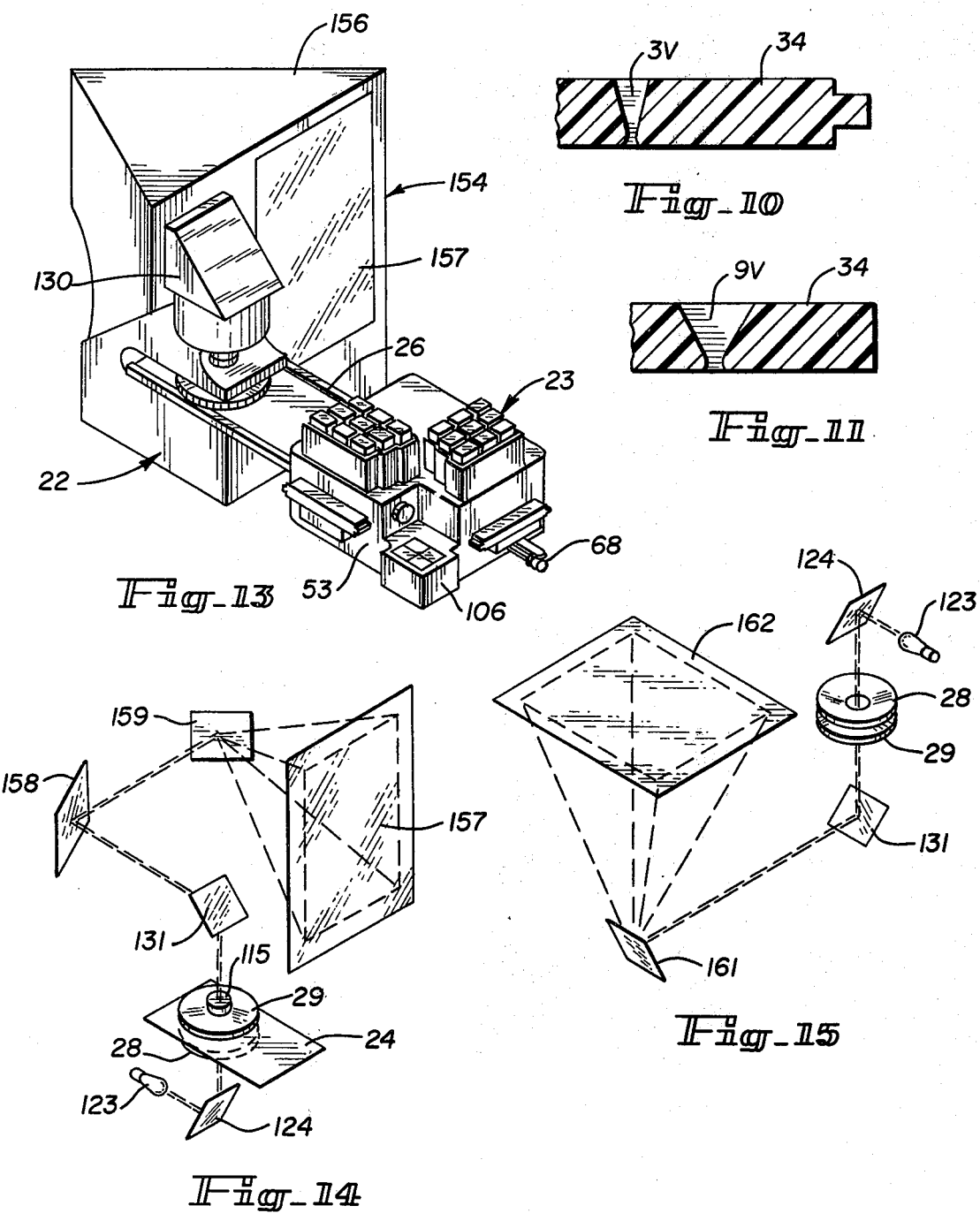

ULTRA-HIGH REDUCTION MICROFICHE LAYOUT AND POSITIONING MECHANISM THEREFOR

CROSS-REFERENCE TO RELATED APPLICATION

This application is a division of application Ser. No. 214,096 filed Dec. 30, 1971, now U.S. Pat. No. 3,871,759.

BACKGROUND OF THE INVENTION

The invention herein disclosed is concerned with the orderly presentation of graphic materials in a manner that will utilize present developments and technologies. Related prior art developments include the printed page and the bound volume or book, insofar as the printed page is an ordered presentation of graphic materials and a book is a serial presentation of related pages that makes indexing or search operations easier. The invention is also related to microfilm and microfiche developments which have previously made it possible for the materials of a printed page to be reduced in size for preservation on film whereby the bulk size of materials previously presented in page or book form can be substantially reduced. For indexing and mounting purposes, aperture cards and other film mounting devices have been used for the convenient preservation of the film images for later and convenient retrieval of desired information.

In connection with microfilm, microfiche and aperture card developments, previous inventions have been directed to means and apparatus for sorting and redisplaying or copying the stored materials. In general such previous selection devices have either relied on mechanical manipulation, as where the microfilm is unreeled from a storage spool, or on electrical or electronic selection of individual film frames. Other selection systems utilizing aperture cards or microfiche jackets are concerned with the location of single or multiple page film mounting devices. Once the proper aperture card or microfiche film card or envelope or jacket has been selected, however, individual user manipulation is usually required for the selection and display of each separate page presented by the carrier film. The selection of the actual page to be displayed and of each successive page to be viewed thereafter requires hand manipulative operations that are not fully satisfactory. Even where guidance is provided by a grid index card, successive image selection or page to page stepping is usually not regulated or automatic and, accordingly, the serial presentation of successive page images is not facilitated.

Within the scope of prior developments it is possible to present all of the materials that normally would be provided in a book on a single film sheet. With a reduction ratio of 24X, a 6 × 4 inches microfiche card could contain 98 letter size pages. Accordingly, a full length book of just under 400 pages could be presented on four microfiche cards. With greater reduction ratios the materials of a full length 400-page book could be presented on a single microfiche card of the same size.

The weight and bulk advantages of such present developments are recognized, but it is not believed, however, that these advantages will encourage the extensive publication of book type materials in this microfiche type presentation. Problems are still involved in the fields of cataloging such a microfiche book for easy selection, use and duplication, and it is not believed that reader or user requirements are at present fully satisfied by the desk type readers or reader-printers which utilize microfiche cards or jackets. The mentioned problems of individual image or page selection and the step presentation of successive pages are believed to present barriers to the widespread usage of presently existing formats in substitution for books that reader-users can hold at desk level or in the lap for convenient observation. The bulk size of present reader-selector units and an associated problem in the limited positions for image display are believed to be factors limiting the more widespread usage. A system presenting improved solutions to the outlined problems that will also improve indexing and retrieval operations while again reducing the bulk size of both the required apparatus and the stored and cataloged materials is believed to be advantageous.

SUMMARY OF THE INVENTION

As an adjunct to the development of a new "book" publishing field, the present invention seeks to incorporate the size reduction advantages of microfilm together with the film mounting and catalog and retrieval conveniences of aperture cards. Images presenting an entire book of 100 or 400 pages are disposed in ordered sequence on the film strip of a single aperture card. A projector-selector instrument is provided which facilitates the selection of any desired page and which further makes the serial presentation of successive pages convenient and efficient by providing a mechanical stepping mechanism which moves the film strip and aperture card a distance corresponding to the reduced size of a single image page. The projector-selector instrument is all embodied in a minor sized package which may be positioned for convenient reader viewing on a desk top or in a reader's lap. Notwithstanding the small size of the projector-selector instrument and its convenience of use, a short path magnification system is incorporated that provides up to 150X magnification. The page images are enlarged in a light path extending from the aperture card film insert to a viewing mirror from a size of 1.5 to 2.0 millimeters on the film up to 115 by 280 millimeters as a full size page image at the viewing mirror. The optical system also incorporates a full image rotation feature to facilitate the viewing of page materials that may have been initially printed at other than standard orientation. Additional elements are provided for the dissipation of the intense heat associated with the high magnification light path.

The selector mechanism utilizes paired selector plates that are free to move individually in reciprocal paths guided by a cross slotted carriage that is joined to an aperture card support mount. Movement of either selector plate causes movement of the carriage a corresponding distance and direction. With this arrangement the film strip of the aperture card is moved with respect to the light source and magnifying lenses a distance corresponding to the conjoint movement of the selector plates. With the page images arranged in ordered rows and columns, serially numbered keys and associated cam pins disposed on the selector mechanism are used to engage cam slots in the selector plates and to move the plates one step at a time if the cam pin keys are pressed in serial order. One set of keys controls horizontal movement of one selector plate, while a separate set of keys controls vertical movement of the other selector plate. The carriage moves any resultant course and distance as determined by the keys depressed, or it can be moved freely along horizontal, vertical or diagonal paths for random page selection or location. A base point return is provided to move the carriage to reference positions that corresponds to a first or other image page. A zero or base point adjustment is also provided to coordinate the exact positioning of the film images with respect to the card support mount and to compensate for any minor errors in the mounting of the film insert in the aperture card. Once a correcting adjustment has been made (if necessary), any desired page can be immediately located by pushing the keys corresponding to the page number. The cam pins associated with the keys can only be depressed when the corresponding cam slots of the selector plates are in proper position, since the cam pins will not engage any other cam slots. After the desired page has been located, other adjacent or following or leading pages can be serially presented by depressing the row keys one after another in the desired serial order.

BRIEF DESCRIPTION OF THE DRAWINGS

FIG. 1 is a side elevation in partial cross-section showing features of an assembled embodiment of the invention, FIG. 2 is a cross-section taken through an aperture card and carrier, FIG. 3 is a plan view corresponding to FIG. 1, FIG. 4 is a cross-sectional elevation taken along the line 4—4 of FIG. 3 with parts broken away, FIG. 5 is a diagrammatic plan representation corresponding to the orientation shown in FIG. 3 and illustrating the correlation of the selector plates and an aperture card and film insert, FIG. 8 is a diagrammatic representation showing the orientation of one selector plate and its arrangement with respect to a 100 format aperture card film insert, FIG. 9 is a diagrammatic representation showing the orientation of one selector plate and its arrangement with respect to a 400 format aperture card film insert with the film insert being at an increased scale, FIG. 10 is a cross-section through a selector plate taken along the line 10—10 of FIG. 8, FIG. 11 is a cross-section through a selector plate taken along the line 11—11 of FIG. 8, FIG. 13 is a perspective view showing application of a viewer to the projector-selector assembly of FIGS. 1 and 3, FIG. 14 is a layout light path for the embodiment of FIG. 13, FIG. 15 is a representation showing the layout light path for a desk top projector type of viewer display, and FIG. 16 is a schematic diagram presenting an electrical control circuit for the unit.

DESCRIPTION OF THE PREFERRED EMBODIMENT

Figure 6:
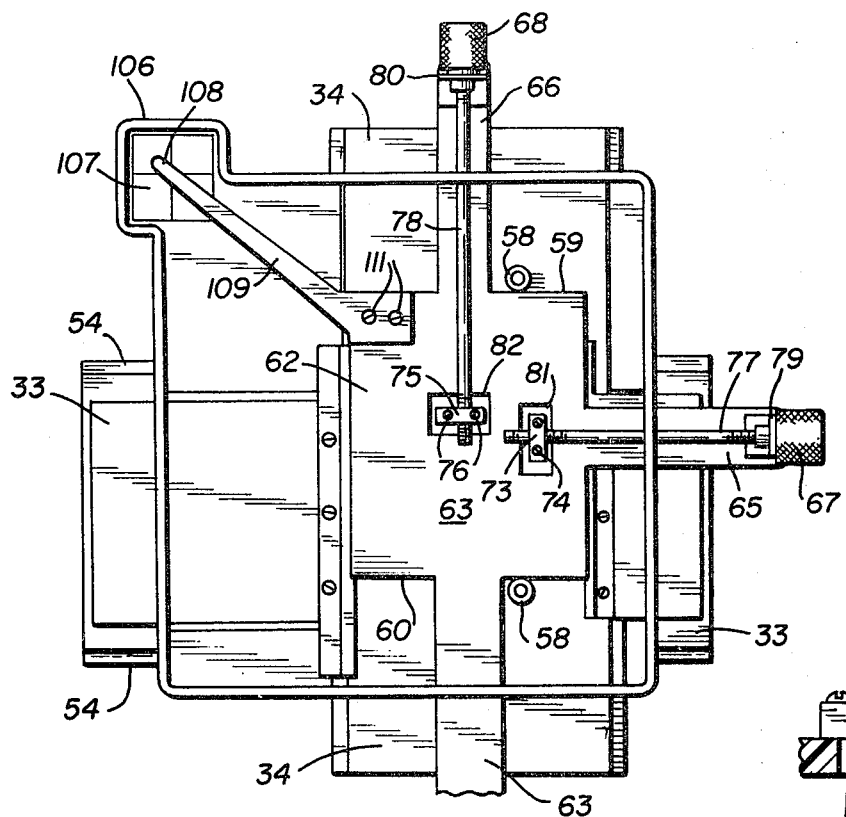
FIG. 6 is a partial bottom view showing further features of the selector mechanism of FIG. 3.

An application of the invention that is sized for convenient usage by individuals is shown in the accompanying drawings. The unit 21 shown in assembled relation in FIGS. 1 and 3 includes a projector component 22 which includes a light source and optical elements and a registrator or selector assembly 23 for moving the film strip of an aperture card from one page image to another for the convenience of the user. In these Figures the aperture card 24 is disposed in an aperture card carrier 26 in such manner that the film insert 27 of the aperture card will be disposed between a lower film gate or support disk 28 and an upper film gate and focus adjusting disk 29.

Whole page images are disposed on the film strip insert itself in patterns as set forth in FIGS. 8 and 9, respectively, depending upon whether the 100-page or 400-page format is used. In both instances the portion of the film strip that is reserved for each separate page image is determined on the ratio of 3 to 4 with the narrower dimension being reserved for the page width and the longer dimension for the page length. In the 100-page format there are 100 rectangular spaces that may be identified from 0 to 99. With this format a page width on the film strip is equal to 3 millimeters and the page length is 4 millimeters. The separate image pages spaces are arranged in ten horizontally disposed rows and ten vertically disposed columns. In the first row the identified page spaces run from 0 to 9, while in the first column the identified spaces run 0, 10, 20 . . . to 90. With this arrangement if page 46, for example, was to be located, it would be in the 40 row, which is the fifth row down, and it would be in the seventh column directly beneath page 6 of the top row. (See the X on FIG. 8.)

Since the film strip size for a standard aperture card is 35 by 47 millimeters and the total view area thereof for a 100-page format is 30 by 40 millimeters, it is obvious that a selector mechanism that is to be used to locate any particular page will have to be carefully and accurately designed and fabricated. The mechanism illustrated is intended for efficient satisfaction of such objective. In fact, it is actually intended for use under even more stringent conditions, as where the 400 image page format, as shown in FIG. 9, is to be used. In this particular arrangement pages 0 to 99, 100 to 199, 200 to 299 and 300 to 399 are disposed in separate quadrants of an aperture card film strip that is the same overall size as the one used in the 100-page format. With the 400-page format, however, the reduced size of each image page of material is 1.5 millimeters wide and 2.0 millimeters high. In other words, within the capabilities of the entire system in which the present projector-selector is to be used, the conventional 8½-inch by 11-inch printed page can be reduced to an image size of 1.5 by 2 millimeters on the microfilm strip.

The total systems approach associated with this invention is concerned with reducing all of the printed words or diagrams on a conventional size page to this small image size for record keeping and storage purposes. The projector-selector mechanism of the present invention is concerned with locating and displaying any desired page so that an individual user may read and study the materials of the selected page. Thereafter and once a selected page has been located, it is a further purpose to provide a mechanism that will facilitate the display presentation of pages following the selected page or the pages immediately and serially ahead of the selected page. Selector 23 is designed for the satisfaction of these objectives. Additionally, it is considered an advantage of the selector mechanism that these page stepping operations are accomplished mechanically and without the use of electrical or electronic circuits. Further, in order to provide a reader or projector and selector mechanism combination that is convenient for use by individuals, it is desirable that the total mechanism be small enough so that it can be held in the user's hand, or in his lap or on a convenient bench or table. These features relating to the total size of the mechanism are believed to be of considerable importance, since the overall system is intended to be directly competitive with conventionally bound pamphlets and books which, of course, can be held for convenient viewing by individual users.

The mechanism of the present invention is intended, therefore, to not only retrieve and display whole pages of printed material as a whole page that is of a size so that separate printed words or any diagrams are as large as the size in the original materials, but further to provide such a display derived from the film strip of an aperture card where the actual image of a full page is as small as 1.5 by 2 millimeters. With these combined requirements, projector 22 has to provide a substantial amount of light and magnification, and selector 23 has to provide accurate page image selection and positioning.

THE SELECTOR

FIGS. 1 through 12 show features of the mechanisms utilized to select the individual page images. Such mechanism will initially be described in connection with the 100-page format as presented in FIG. 8. For this format and for purposes of discussion considering the rows as being horizontally disposed and th columns vertically positioned, the selector must be capable of moving in horizontal directions on a step by step basis as when page images 0 through 9 are to be observed. Similarly, the selector must be capable of moving the film strip serially in a vertical direction as when pages 0, 10, 20 . . . to 90 are to be observed.

In addition to providing a capability for the stepped movement from one page to the next succeeding or leading page, the mechanism desirably should be capable of accurately locating any desired page so that such individual page can be presented for viewing by the user. If page 46, for example, is to be located, it should be possible to move the mechanism to this page by a stepping operation. The film insert of the aperture card could be moved vertically to the 40s row, and individual stepping could then move the card horizontally until page 46 is displayed. For some uses it is believed that this type of stepping location could be satisfactory, but it is still not quite as advantageous as turning the pages of a book to a desired page. Accordingly, it is a further objective to incorporate an additional capability for the direct location of desired pages. This objective is accomplished by the mechanical selector embodiment presented herein.

Figure 7:
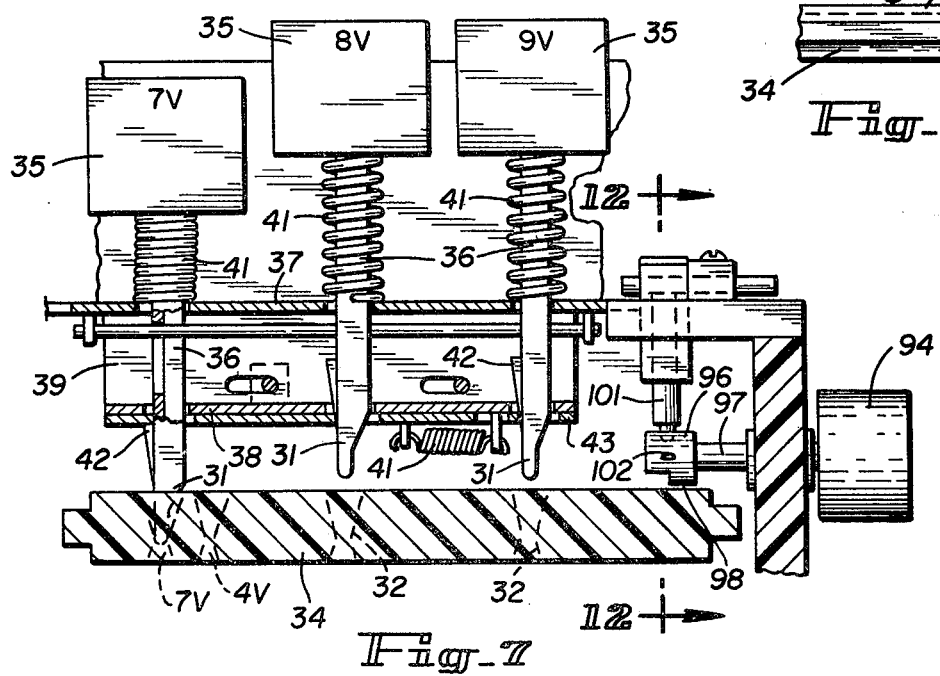
FIG. 7 is a partial elevation showing the key operated cam pins and an associated selector plate.

Basically, the desired results are obtained through use of a plurality of cam pins 31 that are identified with separate keys and that are disposed for mating contact in the cam slots 32 of reciprocally movable selector plates 33 and 34 which are provided for horizontal and vertical adjustments of the aperture card positioning, respectively. In FIG. 5 the separate cam slots 32 are provided with number identification corresponding to the numbering of keys 35 as shown in FIG. 3. As shown in FIG. 7, each key is itself attached to a pin 36 that extends through guide support elements 37 and 38 of a keyboard assembly support 39. The keys may be moved vertically against resistance provided by compression springs 41 when a cam slot 32 is aligned with the cam pin 31 for such key. When the cam slots and cam pins are directly in line, any particular cam pin can be fully depressed, and when fully extended, a catch 42 will be engaged by the reciprocally moving locking plate 43 to hold that cam pin and key in a locked down configuration. If the user's finger is removed from that particular key and a next successive key is then pushed, the successive key will be fully depressed, the particular selector plate will be moved a slight distance and that second key will then be locked down as the first key is released.

The stepping arrangement from one page to another is accomplished as the keys are depressed in serial order. As an example, if page 12 has been selected, only the keys representing pages 11 and 13 or 2 and 22 can thereafter be depressed, since the cam slots representative of any other pages are not then aligned for engagement by the cam pins. This feature is shown diagrammatically in FIG. 4, where it is seen that cam pin 31 for key 7 of the horizontal group is fully engaged, while the cam pin for key 8 is in position so the point of the cam pin will engage the sloping sidewall of its associated cam slot. Accordingly, if key 8 is depressed, key 7 will be released, and the downward motion of key 8 will move the selector plate 33 horizontally until the depressed pin is fully extended and centered with respect to its cam slot. As illustrated, the cam pin 31 associated with the key 9 is not in position to engage its particular cam slot 32. Accordingly, a two page stepping is not possible. When the cam pin for key 7 is centered as illustrated, only keys 6 and 8 of the horizontal group can be depressed to engage their respective slots. If the described stepping from key 7 to key 8 is representative of a presumed change from page 27 to 28, then the only vertical movement controlling keys that could have been depressed while key 7 was engaged would be keys 1 or 3 of the vertical group thereby operating to display pages 17 or 37. All other cam pins will be out of alignment with their respective cam slots.

The effective center distance between the cam pin for key 7 and the cam pin for key 8 of the horizontal group corresponds to the width of an image page for the 100-page format. This effective movement distance is established by the relative shape of the cam pins and the receptacle cam slots. For the 100-page format where the page width is 3 millimeters, the effective distance between cam slots is 3 millimeters or 0.118 inches. The vertical distance between page images is determined by the slots of selector plate 34. Stepping operations utilizing this plate must move the film strip 4 millimeters to change from one row to the next adjacent row. Accordingly, the effective distance between the cam slots on this plate is 4 millimeters or 0.157 inches. Obviously, the keys that operate the cam pins cannot be placed one adjacent the other on this tight a schedule if the keys are to be manipulated by the user's fingers. An offset disposition for the keys controlling horizontal and vertical movement has been adopted. On the horizontal movement controlling cam plate 33 the actual spacing between the separate cam slots for the selector plate is then determined by the actual center distance between successive operating keys and the desired selector plate movement to effect a one-page change in the positioning of the selector plate. Representatively, as in the illustrations of FIGS. 3 and 5, the center-to-center distance for the actual keys 7 and 8 associated with the horizontal selector plate 33 can conveniently be ⅝ of an inch or 0.625 inches. The distance between the cam slots on selector cam plate 33 associated with keys 7 and 8 will then be 0.7432 inches. Depressing key 8 to release key 7 accordingly moves the horizontal control selector plate 33 a distance of 0.1182 inches or the desired 3 millimeters. The offset and spacing details are the same for both the horizontal and vertical keybank assemblies. With this arrangement the structure used for the keybank assemblies can be identical, and only the numbering sequence for the keys is changed. Where the keys and cam pins are all identical the difference in desired cam movement is obtained by changing the depth of the cam slots. Deeper slots are provided on the vertical selector so that an increased travel will be obtained.

As previously stated, the location of any page image is determined by proper selection of the horizontal and vertical keys to effect movement of the horizontal and vertical cam plates 33 and 34, respectively. In order to obtain the desired resultant movement of the aperture card carrier 26 and its supported aperture card 24, the movement of either the horizontal or the vertical cam plate must provide an identical movement of the aperture card carrier 26. Necessarily, the cam plates 33 and 34 must move cooperatively. For the described embodiment cam plate 33 is mounted for straight line reciprocal movement with respect to the support frame 53 of selector 23. Guide rails within frame 53 engage the mating tongues of selector plate 33 to accurately restrain this selector plate for true reciprocal movement. This directional freedom of motion is, however, relatively limited, since it is only necessary that aperture card 24 be moved a horizontal distance corresponding to the narrow dimension of its film insert 27. A carrier 56 is attached to horizontal selector plate 33 and depends therefrom. This carrier 56 supports the guide mounting rails 69 for vertical movement of carrier 26. Vertical selector plate 34 is permitted to move reciprocally with respect to frame 53 in guides 57 and at right angles to the carrier 56 and horizontal selector plate 33. The aperture card carrier 26 is in effect then joined to the vertical selector plate 34, and the vertical changes initiated by movement of vertical selector plate 34 and horizontal changes initiated by horizontal selector plate 33 are transmitted to the aperture card carrier. The motion transmission, however, is not direct, since it is desirable to provide some means for making minor adjustments in the orientation of the aperture card film strip and the page images thereon with respect to the light source and lens system of the projector component 22. In order to accommodate such minor corrections in the total orientation of selector plates and film strip images, guide pegs 58 are provided which extend below the selector plate 34. These guide pegs engage opposite ends 59 and 60 of box element 61 of an adjustment assembly interconnector 62.

Adjustment assembly 62 includes a plate 63 which interconnects selector 23 and aperture card carrier 26. As shown in FIG. 3 the plate 63 is connected to aperture card carrier 26 by mounting screws 64. Plate 63, as shown in FIGS. 4 and 6, has extension arms 65 and 66 providing support for horizontal and vertical adjusting knobs 67 and 68. Box element 61 is disposed above the plate 63 and is adapted to move reciprocally in guides 69 that are attached to the carrier 56 on faces thereof opposite the guides 57 for the vertical selector plate 34.

Box element 61 encloses a first U shaped slide 71, the open ends of which are disposed downwardly in FIG. 4. These ends closely engage the internal surfaces of box ends 59 and 60 with the end 59 being partially shown. This entire U shaped slide 71 is then free to reciprocate left and right as illustrated in FIG. 4. A mating cross slide 72 having its open ends disposed upwardly engages the edges of the U shaped slide 71 and is, accordingly, constrained to move in and out with respect to the FIG. 4 illustration and at right angles to the movement for slide 71. Necessarily, the cross slide 72 is narrower than the distance between the internal faces for the downwardly opening legs of the slide 71. Plate 63 is attached to the cross slide 72. A pedestal 73 extends through plate 63, and it is attached to one of the sides of box 61 by use of screws 74. In similar manner a pedestal 75 depends from the U shaped slide 71 and extends through the plate 63. This pedestal 75 is attached to cross slide 71 by the screws 76. Each of the pedestals 73 and 75 are threaded and are, accordingly, adapted to receive horizontal adjusting rod 77 and vertical adjusting rod 78, respectively. A thrust receptacle 79 is provided by the plate extension arm 65, while a similar thrust receptacle 80 is disposed on extension arm 66. With this arrangement rotation of the adjusting knobs 67 and 68 will cause a change in distance between their respective bearing receptacles and the threaded pedestals.

If a minor adjustment is to be made in the horizontal disposition of an image page, the horizontal adjusting knob 67 will be rotated. If this knob is rotated to shorten the effective length of the rod 77, the plate 63 will be moved to the left in the FIG. 4 illustration. This result is obtained, since pedestal 73 is in effect an anchor that cannot be moved since box 61 to which it is attached is restrained by the guides 69. When the plate 63 moves to the left, cross slide 72 will be moved to the left, and U shaped slide 71 will likewise be moved a corresponding distance. The movement of slide 71 provides a corresponding movement of its attached pedestal 75. Accordingly, pedestal 75 will remain aligned with plate extension 66 and with vertical adjusting knob 68. When this knob is rotated with respect to thrust receptacle 80, the length of vertical adjusting rod 78 is effectively changed. Pedestal 75, however, is engaged to a leg of the slide 71, and this leg is itself disposed against the inner wall of box end 59. Box end 59 is itself engaged by a guide peg 58, and it does not move if one of the vertical selector keys is depressed to engage the cam slot of the vertical selector plate 34. Accordingly, rotation of the vertical adjusting knob 68 will result in vertically oriented adjusting movement of the plate 63. This movement is permitted, since the cross slide 72 is narrower than the depending legs of the slide 71 and can move in and out with respect to the illustration of FIG. 4. Since only minor position adjustments are necessary, the holes 81 and 82 through plate 63 for the extension of pedestals 73 and 75 may be rather small.

In summary of the overall purpose for the selector 23, it is stated that the selector provides for regulated movement of the plate 63 in horizontal and vertical directions. The selector keys, pins, selector plates and cam slots thereof provide movement in regulated increments. The adjustment assembly inclusive of the adjusting knobs, the box elements and slides, etc. provide for minor position movement adjustments of a non-regulated or selective characteristic as necessary to provide correction for minor misalignment of the film strip and the page images with respect to a desired norm.

A further characteristic of the selector mechanism that is best explained in connection with the 100-page format is embodied in the fact that if a particular page is to be selected, pressure may be exerted against a key or keys identifying such page. As the corresponding selector plates are moved manually by finger pressure exerted directly thereagainst, the associated cam pins will ride along the top surface of the selector plates until the desired cam slot is under the pressed pin. By reason of the offset disposition of the selector keys and the corresponding offset disposition of the cam slots, the pins will never be engaged in any wrong cam slot. In FIG. 7 where the vertical selector key 7 is depressed, it is seen that the cam pin 31 for this key is directly aligned with and engaged in cam slot 7V of selector plate 34. Slot 4V, and in fact all of the other slots on selector plate 34, are out of line therewith (see FIGS. 5 and 7). The same distributed alignment is provided for horizontal selector plate 33 and its associated keys. If the 7V key is depressed to engage its vertical selector plate slot, any of the horizontal selector keys may still be depressed, and the horizontal selector plate can still be reciprocally moved to select any page number from 70 to 79. Since both plates are biased to return to a zero page position, this type of page selection can be rapidly accomplished when the indexing keys for the desired page are pressed downwardly against the selector plates, and the plates are reciprocated along their respective guide paths.

The same described selector mechanism can be used for page selection where a 400-page format is used. FIGS. 8 and 9 in part demonstrate the changes that are made in the selector plates for these changed formats. FIG. 8 is an illustration of a 100-page vertical selector plate 34 and associated aperture card 24 with the page distribution layout 87 for a 100-page film strip 27. In FIG. 9 a vertical selector plate 134 for the 400-page format is shown. In this same Figure the page distribution layout 187 for the 400-page format is shown, but this illustration is provided at an increased scale in order to avoid confusion. The actual size of the film strip 27 for the 400-page format is identical with the size of the film strip for the 100-page format. This film strip size is also identical with the film size for standard aperture cards.

As shown in FIG. 9, the 400-page format selector plates are provided with a duplicate set of cam slots 132. Accordingly, there are two cam slots in position of alignment with each of the selector pins of the selector mechanism 23. The distance between the aligned cam slots for any particular selector key corresponds to the size of one quadrant for the 400-page format. Since plate 134 is a vertical selector plate, the distance between the cam slot 7V and 7V identified by the numerals 91 and 92 is equivalent to the distance from the top line 90 and the intermediate cross line 95 of page layout 187. If the positioning of the corresponding horizontal selector plate is regulated for quadrants I and III by use of a similar control knob 104 shown in FIGS. 1 and 3, pages from 70 to 79 of quadrant I can be selected when cam slot 91 is engaged. When pages 270 and 279 are to be selected in quadrant III, cam slot 92 will be engaged.

Figure 12:
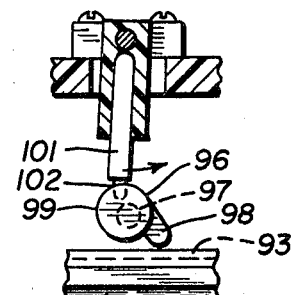
FIG. 12 is a detail taken along the line 12—12 of FIG. 7 showing features of a quadrant selector device.

A control is provided on the selector 23 to regulate the proper quadrant selection when the 400-page format is used. An interconnected slot 93 is cut in the top face of selector plate 134. As identified, the outermost portion of the slot regulates selection in quadrants I and II, while the innermost portion thereof regulates use of quadrants III and IV. A stop or follower mechanism for use in connection with this slot 93 is shown in FIGS. 4, 7 and 12. Control knob 94 is mounted in the frame 53 for partial rotation. A follower 96 is disposed on the mounting shaft 97 for control knob 94. Follower 96 has a stop extension 98 that may be rotated to engage in the III–IV segment of slot 93. If control knob 94 is rotated in an opposite direction, an eccentric lobe 99, which is laterally aligned with the I–II segment of slot 93, will be engaged therewith. A spring loaded detent plunger 101 is provided for engagement in detents 102 in the face of follower 96 to hold the follower in selected positions whereby stop 98 may be engaged, the lobe 99 may be engaged, or follower 96 may be held in a neutral position. When either the stop 98 or the lobe 99 is engaged, the reciprocal movement of vertical selector plate 134 is restrained, and accordingly, only one cam slot can be engaged by any cam pin. If stop 98 is engaged in segment III–IV portion of slot 93, only the cam slot 91 will be engaged when selector key 7V is depressed. If lobe 99 is engaged in the segment I–II portion of slot 93, only the slot 92 can be engaged. Since a similar control knob is provided for use with the horizontal selector plate in the 400-page format, the desired page selection can be restricted to any of the four quadrants.

In order that the user may readily observe the particular quadrant selection, an indicator unit 106 is provided. Indicator 106, as shown in FIGS. 3, 6 and 13, has a see-through glass 107. Lines dividing the glass into quadrants are provided. Essentially the cross line corresponds with the line 95 of the 400-page layout 187 illustrated in FIG. 9. The separate quadrants are identified with the Roman numerals. A pointer 108 may be observed through the Roman numerals. A pointer 108 may be observed through the glass 107. This pointer moves physically with the plate 63 on which it is mounted. An arm 109 for the pointer 108 is joined to the plate by mounting screws 111. With this arrangement the position of the pointer is, in fact, related to the actual orientation of the image page that is selected. The indicator 106, however, will be used primarily to advise the user regarding quadrant selection.

For the 400-page format the size of each image page is only 1½ × 2 millimeters. The stepping distance from one page to another is, accordingly, half that provided for the 100-page format. Since the stroke for the cam pins is unchanged, the reduced motion is obtained by changes in the design and configuration for the cam slots used in the 400-page format. Further, since the stepping distance is reduced, the center-to-center distance for adjacent cam slots is also reduced. The keys, such as keys 7 and 8 for horizontal selection, are still ⅝ of an inch apart. The stepping distance, however, in only 1½ millimeters or 0.059 inches. Accordingly, the distance between the cam slots for adjacent keys, such as keys 7 and 8, will be 0.6841 inches. The effective center-to-center distance between the cam slots for sequential keys for the vertical selector plate 134 will be 2 millimeters or 0.078 inches, such as between slot 91 for 7V and slot 103 for 8V.

THE PROJECTOR

Features of the projector component are shown in FIGS. 1, 3, 13 and 16. As best shown in FIG. 1, projector 22 is inclusive of a main support body 112 of general C frame shape providing a receiving slot 113 in which the lower film gate 28 and upper film gate 29 are mounted. The aperture card carrier 26 and its supported aperture card 24 are adapted for introduction through the slot 113 with the film strip 27 of the aperture card being disposed between the lower and upper film gates 28 and 29, respectively. A small rectangular opening 114 is provided through the film gates as a frame for confining the light from the projector to an area illuminating a single image page on the film strip for the aperture card 24. A magnifying lens 115 is accurately positioned above the established film gate, and cam adjusting means 116 are provided intermediate the upper film gate 29 and its mounting on the projector body 112 so that the distance between the image on the film and the lens 115 may be closely adjusted.

For even the 62.5X lens the distance regulation for the film and the lens must be closely controlled. In fact, the combination of high magnification and the fine focus provided by the cam adjustment is accurate enough to provide separate focusing where images may be printed on alternate sides of a film strip that is only 5 mills thick. This capability for the apparatus actually presents opportunity for providing even an increased number of image pages on a single film strip insert. Due to the fine focal adjustment and high magnification, the 100-page format could actually carry 200 image pages through the simple expedient of providing separate image pages on opposite sides of the film strip. With a first adjustment all of the materials on one side of the film strip can be observed, and with a minor alternate adjustment the materials on the opposite side of the film strip will be brought into focus for observation. Where adequate light is provided this doubling of image capacity can be accomplished through use of the present apparatus.

Lower film gate 28 is mounted on springs 117 which constantly urge the lower film gate toward the upper film gate. At time of use then these film gates of metallic material will be separated only by the thickness of the film strip in the aperture card. The contact and non-contact features thus provided is used in the electrical control for projector 22. Leads 118 and 119 are connected to the lower and upper film gates, respectively. When the aperture card and its film strip are removed, a circuit will be completed between the leads 118 and 119. Oppositely, when an aperture card is in position for viewing, the film gates will be insulated one from the other, and the circuit will be broken.

Projector body 112 provides support for a fan motor 121 having an air circulating fan blade 122 and for a light source or lamp 123. Lamp 123 is actually mounted in a drawer assembly together with a cold mirror 124. The drawer assembly provides a heat sink 126 that is removable from body 112 together with the lamp and cold mirror. The heat sink which surrounds and supports cold mirror 124 is preferably a multi-finned aluminum extrusion of generally cylindrical shape. Many fins 127 are provided to extend longitudinally along the cylindrical heat sink in aligned positions parallel to the air flow from fan blade 122. These fins more efficiently dissipate the heat generated by the lamp 123 and also provide flow passages for the air blown thereagainst. At the top of heat sink 126 support is provided by the fins or other structure for the baffle glass 128 through which light from the lamp 123 that is reflected by the cold mirror 124 passes to illuminate the film strip. Baffle glass 128, of course, tends to block off heat that might otherwise tend to burn the film strip. Since the projector-selector unit 21 is relatively small and further since the images on the film strip 27 are very small, the magnification used must be quite great. Substantial light is required. For the combination illustrated the heat sink, inclusive of its fins, is approximately 2½ inches in diameter. The lens 115 is approximately 1 inch in diameter. The light path distance from reflector surfaces of the lamp to the film plane is approximately 3 inches, and where a 62.5X magnification lens is used approximately 100-foot candles of illumination will be required at the lamp side of a viewing screen. With these limitations an embodiment of the invention utilizes a 12-volt 65-watt lamp which has a maximum bulb temperature of approximately 1000° C. In order to dissipate this quantity of heat, a closely engineered assembly is required. The fan blade, which is approximately 2½ inches in diameter, is rotated by a fan motor at a full load rate of approximately 7000 R.P.M. This moves a considerable quantity of cooling air past the lamp 123 and the fins 127 of heat sink 126. Air is also projected past baffle glass 128 and across the fins on the base side of lower film gate 28.

One additional feature for the dissipation of the heat, however, is directly concerned with the design and fabrication of cold mirror 124. This element is of a dichroic type having the front surface of a ⅛ inch thick bevel edge glass coated to provide a dichroic reflective surface for reflecting 90% of light in the visible range while transmitting not less than 80% of wave energy in the infra-red range. Compound No. 956 provided by Liberty Mirror has been found satisfactory for this purpose. Necessarily, the transmission of infra-red energy substantially reduces the amount of heat that otherwise would be conveyed to the film strip. Withoug such a selective reflectivity characteristic the film strip would be burned after a too short viewing interval.

The light that is conducted to the film plane and passed through the opening 114 is further projected through magnifying lens 115, through a projector throat 129 and a turret assembly 130. Projector throat 129 and turret assembly 130 are mounted on and supported by the projector body 112. Turret 130 is itself rotatably mounted with respect to such body so that a turret mirror 131 and its associated support frame may be rotated. Mirror 131 is disposed at a 45° angle. Accordingly, any light transmitted through the film plane and lens combination to be directed against the mirror 131 will be projected therefrom at right angles to the axis of the turret 130. If required for projection or other auxiliary viewing purposes, an auxiliary lens 133 shown only in dotted outline may be positioned in a lens receptacle 135 provided by the throat 129.

The projector shown is intended to be used for various viewing purposes. For some usage a light path extending downwardly through the lens may be advantageous. In order to facilitate such alternate positioning and uses, the exterior size of a turret mount 136 and of a lower boss 137 on body 112 may be made identical. Further, if the shoulders 138 and 139 adjacent the turret mount 136 and round boss 137 are equidistant from the film plane established by the aperture card 24, the projector 22 may be conveniently inverted without requiring a changed positioning for the selector component 23. Additional mounting elements, not shown, are, of course, provided to hold the projector 22 and selector 23 in fixed relative positions at time of use so that only the aperture card and various mountings and supports and selectors associated therewith will be moved when the various page images are to be viewed.

The utility of projector 22 is further benefited by an electrical or electronic control system used in connection with the power source, fan and lamp components of projector 22. A schematic diagram useful in illustrating features of a beneficial operation is shown in FIG. 16. As previously stated, there is substantial heat to be dissipated. Accordingly, it is desirable that the fan be on at all times that the lamp is on. However, it is also desirable that the fan should be on for a period of time after the lamp is out in order to get rid of accumulated heat. To accomplish this purpose and further to avoid use of the lamp when the unit is not being used, power to the lamp is controlled by the closing of contacts between the lower and upper film gates 28 and 29. If an aperture card and its film strip is removed, no viewing purpose is being served, and, accordingly, the lamp should be off.

As indicated in FIG. 16, the input power from a household circuit, as provided by the cord 141, goes first to a transformer 142. Output power therefrom at 12 volts supplies the lamp 123 and fan 121. A relay 143 is connected to switches 144 in the lamp circuit and 145 in a primary fan circuit. When the film strip is removed and the upper and lower film gate components 28 and 29 are in contact, relay 143 operates to open switches 144 and 145. This cuts off power to the lamp 123 and in the primary fan circuit, but an alternate circuit 146 is provided for the fan 121. This alternate or secondary circuit includes a time delay component 147 which will operate to keep the fan running for an established period of time as necessary to assure cooling of the heat sink, cold mirror and other components adjacent lamp 123. In general, the time delay component and any required additional controls may be embodied on a printed circuit board 148 to be disposed within the projector body 112. Preferably such printed circuit board and all components thereon or attached thereto can be disposed in an incoming air path for the fan blade 122 thereby assuring regular and efficient operation of such components.

When greater magnification is required, as where the 400-page format is to be used, a separate lens may be substituted for the lens 115. To accomplish such changeover the entire lens barrel 115 is removed and a substitute lens barrel is provided. A lens of 125X magnification is suggested for use with the 400-page format. When the higher magnification lens is used, any auxiliary lens 133 will be positioned closer to such 125X lens. Throat 129 can accommodate such changes in the magnification path through provision of multiple lens receptacles or telescoping assemblies. Telescoping elements will facilitate wall type projection operations and image focusing.

READER-VIEWERS

Representing apparatus embodiments for the display of materials selected by the selector and magnified by the projector are shown in FIGS. 13, 14, and 15. In FIG. 13 a viewer assembly 154 is shown that may be directly attached to the unit comprised of the projector 22 and selector 23. The viewer assembly includes a box enclosure 156 providing support for a mirror system and a viewing screen 157. Where either the 100 or 400 format is used the viewing screen 157 will be of adequate size to display the conventional 8½ × 11 inch page in near full size.

The light path for the assembly of FIG. 13 is shown diagrammatically in FIG. 14. Here light from the lamp 123 passes first to cold mirror 124 and thence through the framing openings of lower and upper film gates 28 and 29. The light then passes through the lens 115 to turret mirror 131 where it is reflected by this 45 degree mirror at right angles into viewer assembly 154. Intermediate mirrors 158 and 159 guide the light along an extended light path to the viewing screen 157. The image page and all of the characters thereof may be closely focused on a prepared surface of such viewing screen 157 for observation by the user. The entire viewer assembly 154 may be conveniently attached to the turret assembly 130.

The entire unit, inclusive of the viewer assembly 154, is actually of relatively small size. Accordingly, this assembled unit may be held in a reader's lap, or it may be positioned on a convenient desk or other support.

For convenience of usage where the printed materials on successive pages may be oppositely oriented or at right angles one to the other, the selector 23 and projector 22 may be moved one with respect to the other to rotate the aperture card and thereby change the orientation of materials displayed on the viewing screen. The turret assembly 130 may also be rotated with the entire viewer assembly 154 to obtain a similar result. For other viewer arrangements the rotation of the turret assembly 130 itself with respect to the main support body 112 will accomplish a similar reorientation of the image to be viewed.

A further and alternate light path is illustrated by FIG. 15. Here the projector 22 would be used in inverted position, and light from the lamp 123 would pass downwardly from cold mirror 124 to the turret mirror 131 or other lowered reflector. This type of assembly can be used for a desk top viewer where the selector and projector are disposed on top of a desk, and the light is directed downwardly from such desk top to be reflected by an intermediate mirror 161 in a return or upward direction for display on a horizontally disposed viewing screen 162.

For additional viewing purposes an auxiliary lens, such as the lens 133, may be used, and enlarged images may then be projected on a viewing screen. With mirror 131 removed images may be projected to a wall or other display area. Essentially it is intended that the selector and projector components are to incorporate features that will facilitate these many and varied alternate uses. These components, accordingly, are readily adapted for use with various existing types of viewers, readers or reader-printers. The compact nature of the described preferred embodiments and of modifications thereof particularly qualify these components for such alternate uses.

I claim:

1. A selector component for use when locating image pages and materials presented in ordered arrangement on a layout sheet comprising a selector body, a carrier for said sheet mounted for movement with respect to said body, a vertical guide system for constraining vertically oriented movements of said sheet carrier, a horizontal guide system for constraining horizontally oriented movements of said sheet carrier, guide ways provided by said body, separate horizontal and vertical selector plates mounted on said guide ways for reciprocal movement at angles of 90° one to the other, means constraining said sheet carrier for movement with either of said horizontal or vertical selector plates, and indexing means for establishing relative horizontal and vertical positioning of said guide ways, guide systems and sheet carrier.

2. Structure as set forth in claim 1 wherein horizontal and vertical movements of said carrier can be made independently of movements of said vertical or horizontal selector plates, respectively.

3. Structure as set forth in claim 1 wherein a plurality of cam surfaces are provided on each of said selector plates.

4. Structure as set forth in claim 3 and further comprising index keys on said body for movement toward engagement with each of said selector plates.

5. Structure as set forth in claim 4 wherein cam elements are provided for each of said keys and cam surfaces are provided on each of said selector plates.

6. Structure as set forth in claim 5 wherein selection of any index key causes a corresponding engagement between the cam element of the key and the cam surface of said selector plate whereby the selector plate is moved to a position identified with the chosen index key.

7. Structure as set forth in claim 6 wherein said cam elements are pins attached to said keys and wherein said cam surfaces are cam slots provided in said selector plates.

8. Structure as set forth in claim 7 wherein all cam pins are positioned for engagement in only corelated cam slots.

9. Structure as set forth in claim 8 and further comprising additional means whereby a force tending to depress one index key results in the engagement of the associated cam pin in its proper cam slot thereby establishing the position of said selector plate and sheet carrier.

10. Structure as set forth in claim 7 wherein the layout sheet is a film strip of a standard size aperture card and further comprising a system for the organization of image pages disposed on said film strip whereby the pages of a book may be laid out in horizontal rows and vertical columns with said rows corresponding to the tens of a decimal system and the vertical columns corresponding to digits thereof and wherein said indexing means is useful for selecting a particular image page of said presentation.

11. Structure as set forth in claim 10 wherein the cam slots on each selector plate are disposed in spaced positions whereby selection of numerically adjacent index keys will cause movement of said selector plate a distance corresponding to the size of one image page on said film strip.

12. Structure as set forth in claim 10 and further comprising a lock system for said index keys whereby a depressed key will be held in engaged position.

13. Structure as set forth in claim 12 wherein said lock system is inclusive of a catch on each of said cam pins and a reciprocally movable locking plate for engagement with the catch of depressed keys.

14. A selector component for use with projectors to facilitate the selection for display of individual image pages and the detail materials thereof where the image pages are presented in ordered arrangement at a reduced size on a microfiche film strip comprising a support body, a magnifying lens mounted on said body, a high intensity light source supported by said body and projecting a beam of light therefrom, a film gate adjacent said lens and intercepting light from said light source for the reception of said film strip, a carrier deck for the support of said film strip mounted on said support body for movement independent of said film gate whereby separate image pages on the film strip may be moved into registration with the film gate, vertical and horizontal guide means for constraining vertically and horizontally oriented movements of said carrier, said image pages on said film strip being laid out in horizontal rows and vertical columns with said rows corresponding to the tens of a decimal system and the vertical columns corresponding to the digits thereof, and indexing means for establishing relative horizontal and vertical positioning of said guide means and carrier.

15. Structure as set forth in claim 5 and further comprising index selectors identified with separate rows and columns for the selection of specific image pages.

* * * * *